United States Patent
Schwarzbich

(10) Patent No.: US 6,238,123 B1
(45) Date of Patent: May 29, 2001

(54) DEVICE AND METHOD FOR INTERCONNECTING STRUCTURAL PARTS

(76) Inventor: Jörg Schwarzbich, Wertherstr, 15 D-33615, Bielefeld (DE)

( * ) Notice: Subject to any disclaimer, the term of this patent is extended or adjusted under 35 U.S.C. 154(b) by 0 days.

(21) Appl. No.: 09/303,658

(22) Filed: May 3, 1999

(30) Foreign Application Priority Data

May 4, 1998 (DE) .......................................... 298 07 967 U
Dec. 22, 1998 (EP) .............................................. 98 124 386

(51) Int. Cl.[7] ..................................................... F16B 9/02
(52) U.S. Cl. .................................. 403/45; 403/46; 403/12
(58) Field of Search ................................. 403/43, 44, 45, 403/46, 47, 48, 167, 168, DIG. 9, 343, 359.1, 359.3, 12

(56) References Cited

U.S. PATENT DOCUMENTS

| | | | |
|---|---|---|---|
| 1,110,201 | * 9/1914 | Hardick | ................................... 403/44 |
| 2,420,364 | * 5/1947 | Espenas | ................................. 403/48 |
| 2,848,259 | * 8/1958 | Huber | ..................................... 403/46 |
| 2,888,832 | * 6/1959 | Winters | ............................. 403/167 X |
| 4,484,831 | * 11/1984 | Hanson, Jr. et al. | .............. 403/47 X |
| 4,682,906 | 7/1987 | Rückert et al. | . |
| 5,702,196 | * 12/1997 | Petercsak | ............................... 403/46 |

* cited by examiner

Primary Examiner—Harry C. Kim
(74) Attorney, Agent, or Firm—Burns, Doane, Swecker & Mathis, LLP

(57) ABSTRACT

Two structural parts are interconnected by a distance holder disposed therebetween. The distance holder includes two supporting bodies and a control element. The supporting bodies are connected to the control element such than an axial spreading-out of the supporting bodies occurs in response to rotation of the control element, whereby the supporting bodies engage respective ones of the structural parts. The supporting bodies are held against rotation about the axis, whereby the structural parts do not become scratched by the supporting bodies.

18 Claims, 7 Drawing Sheets

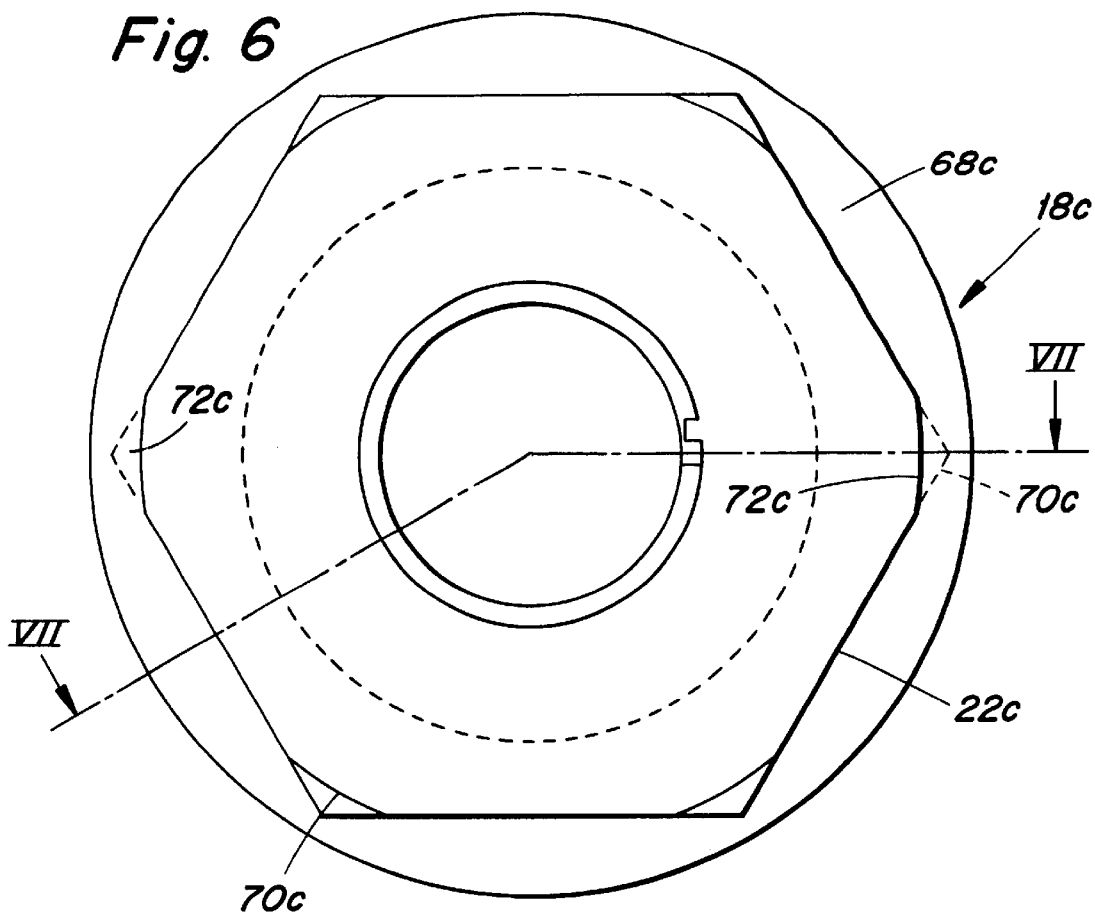
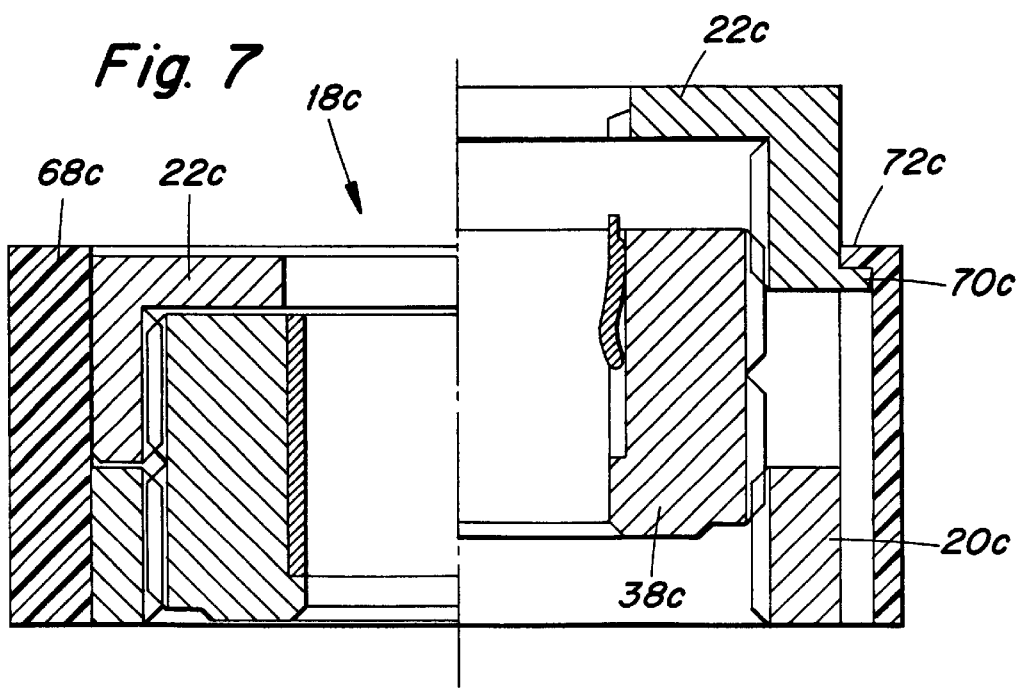

DEVICE AND METHOD FOR INTERCONNECTING STRUCTURAL PARTS

BACKGROUND OF THE INVENTION

The invention relates to a device for interconnecting structural parts by means of a connecting screw. A distance holder is arranged between the structural parts to be connected and is traversed by the connecting screw, which holder is adjustable lengthwise in response to the screwing-in movement of the connecting screw in order to become pressed against one of the structural parts.

In EPO Document No. 176 663-B1, a device of this type is described in which the distance holder comprises a distance washer which presses tightly against the outer thread of the connecting screw so as to be in frictional engagement therewith. This distance washer supports itself with its outer wide side on the one structural part and with thread pitch surfaces on the counter pitch surfaces which belong to the other structural part. If the distance washer is turned during the screwing-in of the connecting screw, the axial position of the distance washer is thus changed. In a suitable screwing direction of the thread pitch surfaces, the distance washer moves in the axially opposite direction to the screwing-in direction of the connecting screw, so that the one structural part can be braced between the distance washer and the head of the connecting screw. In this device, the distance holder is formed directly by the distance washer and the corresponding counter-pitch surfaces. Thereby a construction is achieved that is technically simple to manufacture. There is one disadvantage in that, during the bracing, the distance washer turns relative to the braced structural part which it engages, so that scratch marks or lacquer damage on this structural part can result and thus increasing the corrosion danger.

It is the object of the invention to create a device of the initially mentioned type in which damage of the structural parts can be avoided through a distance holder.

The problem is solved, according to the invention, in that the distance holder has two supporting bodies which are held non-rotatably on one of the structural parts, can be slid axially against one another, support themselves each on one of the structural parts, at least, one of the supporting bodies forming a screw drive together with the control element.

This solution has the advantage that the distance holder supports itself with two torsionally strongly held supporting bodies on both of the structural parts, so that, at the supporting surfaces, no relative turning occurs which could lead to damage or an increased rub resistance.

In a preferred embodiment, the control element cooperates with the supporting bodies to form two screw drives which differ in their threading pitch and/or their screwing direction. If the screwing direction of the screw drives runs opposite, then, with a given threading pitch and angle of rotation of the control element, a doubling of the lift is achieved. If the screwing direction is the same but the threading pitch differs, the change of the axial size of the distance washer is proportional to the difference between both threading pitches, so that a very sensitive adjustment of the distance is made possible.

The threads of the screw drives can be arranged as inner and outer threads at the peripheral surfaces of the supporting bodies and of the control element. They can, however, also be arranged as screwing surfaces at the frontal sides of the supporting bodies and of the control element.

Both of the supporting bodies are preferably locked together, such that they are held together permanently.

Furthermore, it is useful to dispose at least one of the supporting bodies in a plastic housing which, at the smallest possible axial length of the distance washer encompasses both supporting bodies and also the control element. This reduces the danger of an unintentional adjustment of the control element and thus facilitates the automatic feeding of the device in automated installation processes.

BRIEF DESCRIPTION OF THE DRAWING

In the following, preferred examples of embodiments are explained in more detail using the drawing.

FIG. 6 shows a frontal view of the connecting device according to a further embodiment;

FIG. 7 shows a longitudinal cross-section taken along the line VII—VII in FIG. 6;

DETAILED DESCRIPTION OF PREFERRED EMBODIMENTS OF THE INVENTION

Figure 1:
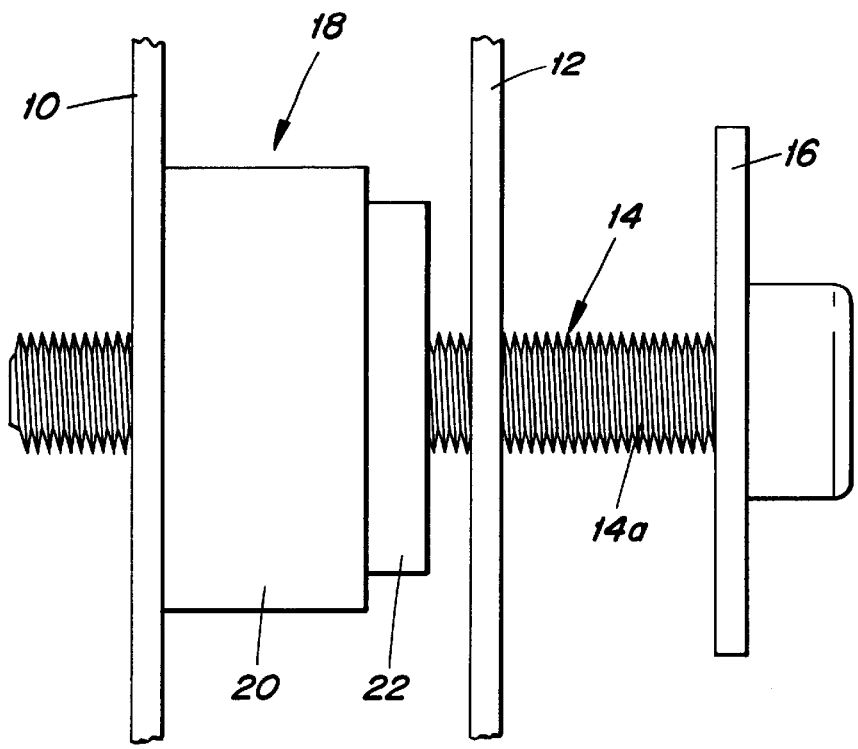
FIG. 1 shows a connecting device according to the invention for connecting two plate-shaped structural parts, the device being in a loose state.
Figure 2:
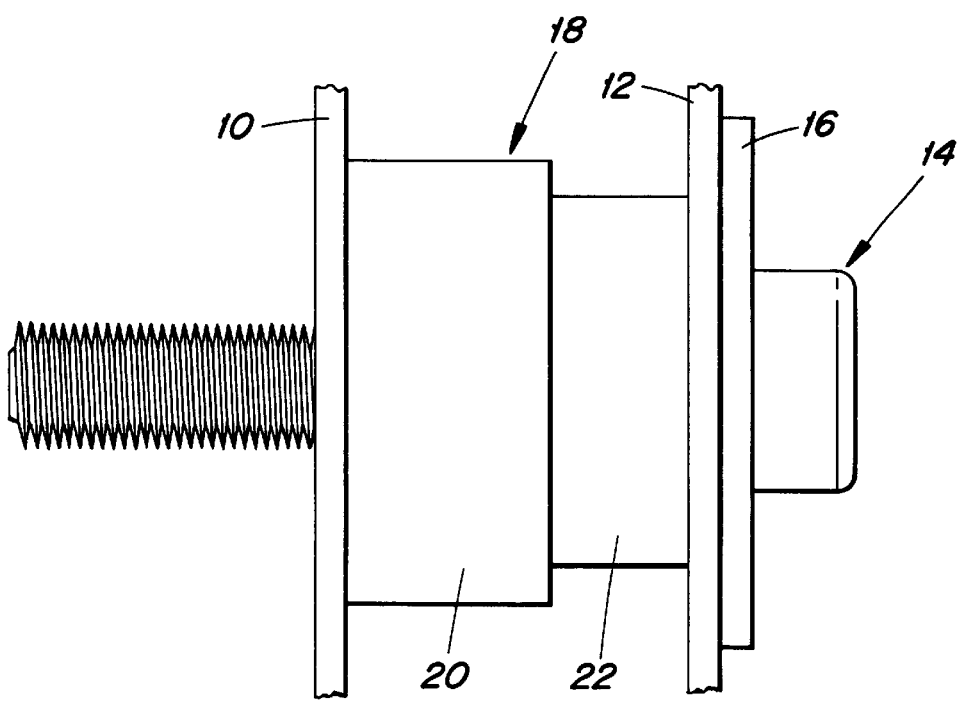
FIG. 2 shows a connecting device, according to FIG. 1, after completion of the connection.

In FIG. 1, two plate-shaped parts 10, 12 are shown which are to be connected to one another at a certain distance. For this, provided is a connecting screw 14 with a supporting disc 16 and a distance washer 18 placed between both of the structural parts 10, 12 on the connecting screw. The distance washer has two supporting bodies 20, 22 which can be slid axially towards one another. If the shank 149 of the connecting screw 14 is screwed more deeply into a, not shown, threading drill hole of the structural part 10, then the supporting body 22 is driven out in the direction of the structural part 12 by means of a control mechanism, which is explained further below using FIG. 9, until, finally, the structural part 12 is tightly inserted between the supporting body 22 and the supporting disc 16, as shown in FIG. 2.

Figure 3:
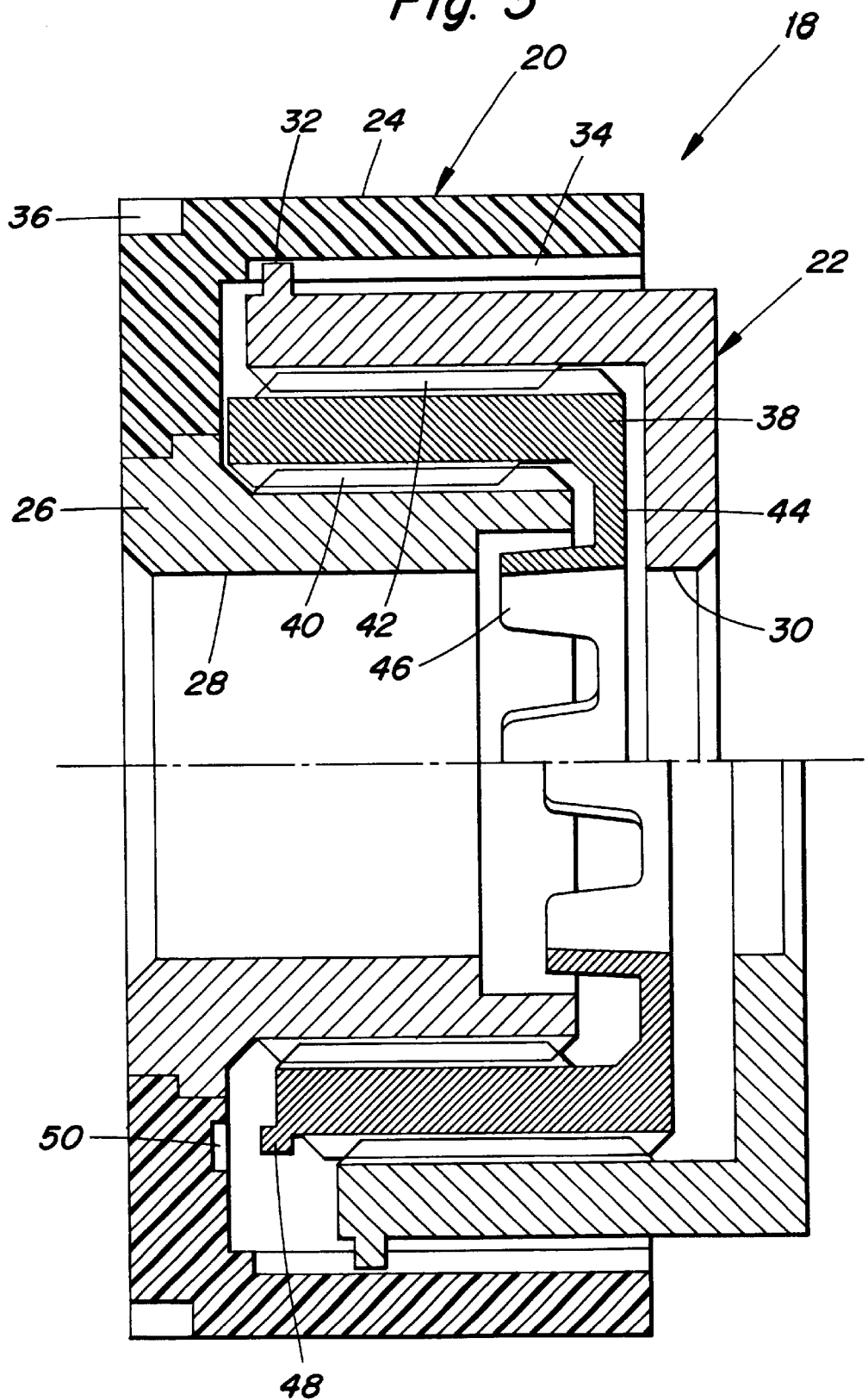
FIG. 3 shows two axial half cross-sections of the connecting device in different positions.

In FIG. 3, the distance washer 18 is shown in an axial cross-section. The top half of FIG. 3 shows the distance washer in the drawn inward position, according to FIG. 1, and the bottom half shows it in the driven out position, according to FIG. 2.

The supporting body 20 has a housing 24 made of plastic, in which coaxially a bushing 26 made of metal is attached. The bushing 26 forms a drill hole 28 through which the connecting screw 14 can pass with a small amount of play.

The supporting body 22 is a pot-shaped body made of metal, of which the floor has a drill hole 30 for the connecting screw that corresponds to the drill hole 28. The supporting body 22 is placed axially in the housing such that it can be slid and is secured, through protrusions 32 which are arranged at its outer periphery and grip into longitudinal slots in the inner wall of the housing 24, against rotation relative to the housing 24. The housing 24, in turn, is held at a high torsional (anti-rotational) strength against the structural part 10. In so doing, both supporting bodies 20 and 22 are held against the structural part 10 with a high torsional strength.

In the pot-shaped supporting body 22, a threading ring 38 made of metal is arranged, of which the threading is engaged via a left threading 40 with the bushing 26 and via a right threading 42 with the supporting body 22, so that two screw drives 26, 40 and 22, 42 are formed for the axial adjustment of both of the supporting bodies. At the right end of the threading ring 38, as shown in the Fig., a flange 44 is provided which protrudes inwardly and carries a plurality of elastic reeds 46 at the inner peripheral edge. If the shank 14a of the connecting screw 14 is placed through the distance washer 18, the reeds 46 lie pressed against the outer threading of the shank of the connecting screw, so that the threading ring 38 is connected with the connecting screw by friction. If the connecting screw 14, while being screwed into the structural part 10, is turned to the right, then also the threading ring 38 is turned relative to the supporting bodies 20 and 22. Due to the left threading 40, the threading ring 38 changes its position relative to the supporting body 20 to the right, and, due to the right threading 42, the supporting body 22 changes its position relative to the threading ring 38 also to the right. In this way, the supporting body 22 is driven out of the supporting body 20, as can be seen in the lower part of FIG. 3.

If the supporting body 22 strikes the structural part 12 and this structural part is held tightly, for example through the head of the connecting screw 14, then the supporting body 22 cannot be further driven out and thus also the threading ring 38 cannot be turned further. The connecting screw 14, then, slips through at the elastic reeds 46. In this way, the connecting screw can be tightly pulled, while the structural part 12 remains in the arrived position.

If the connecting screw is unscrewed to the left out of the structural part 10, the supporting body returns into the driven-in position. At the last threading revolution prior to reaching the final inner position, a protrusion 48 formed at the threading ring 38 (shown at the bottom of FIG. 3) enters into a corresponding cavity 50 of the housing 24. In this way, a stopping device is formed which prevents a further turning of the threading ring 38 and a tight locking of the threading ring at the bushing 26. The threading ring 38, thus, remains smoothly movable, so that it can be turned by frictional engagement during the screwing-in of the connecting screw 14.

In a modified embodiment, a right threading can be provided instead of a left threading 40, the pitch of this right threading being, however, smaller than that of the right threading 42. In the driven-in position of the supporting body 22, the threading ring 38 exhibits, in this case, a certain distance to the floor of the housing 24. If then the connecting screw 14 is screwed in clockwise, the threading ring 38 moves towards the left in FIG. 3, while the supporting body 22 moves relative to the threading ring by a larger extent to the right, so that, in total, a slighter sliding-out movement of the supporting body 22 to the right results.

Figure 4:
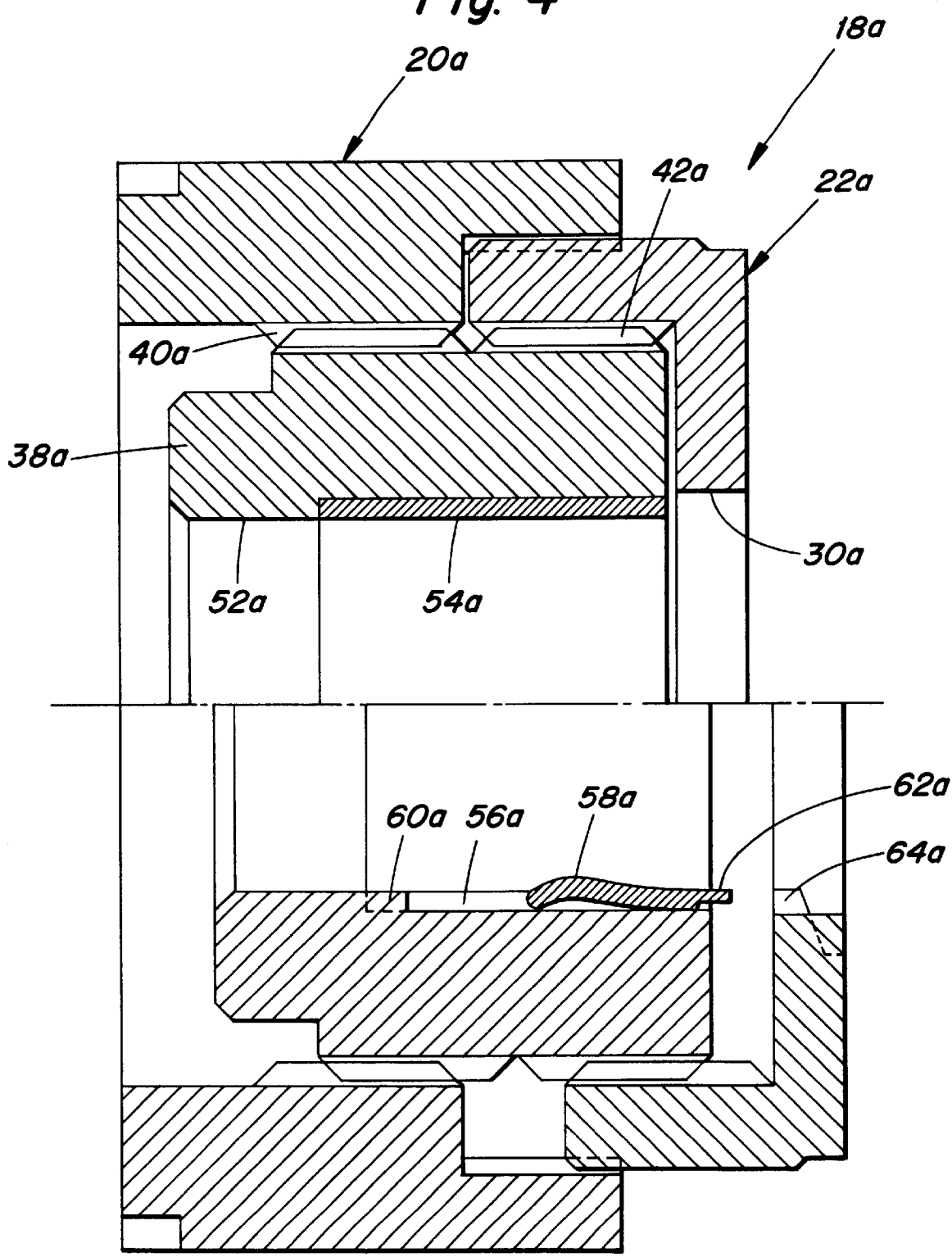
FIGS. 4 and 5 show diagrams analogous to FIG. 3 for alternative embodiments of the invention.

FIG. 4 shows an embodiment of a distance washer 18a in which the left threading 40a and the right threading 42a are arranged in differing axial sections on the outer surface of the threading ring 38a. The threading ring 38a forms a stepped drill hole 52a into which a ring 54a made of elastic steel is pressed. From a longitudinally running slot 56a of the ring 54a, an elastic reed 58a, which lies clamped at the periphery of the connecting screw 14, is pressed outward. At the shoulder of the stepped drill hole 52a, arranged is a protruding part 60a which somewhat protrudes into the slot 56a and, thus, connects the ring 54a torsionally strong with the threading ring 38a.

A stopping device to limit the rotational movement of the threading ring 38a is formed here through a protrusion 62a at the ring 54a, which protrusion 62a strikes against a protrusion 64a of the supporting body 22a protruding inward in the drill hole 30a.

Figure 5:
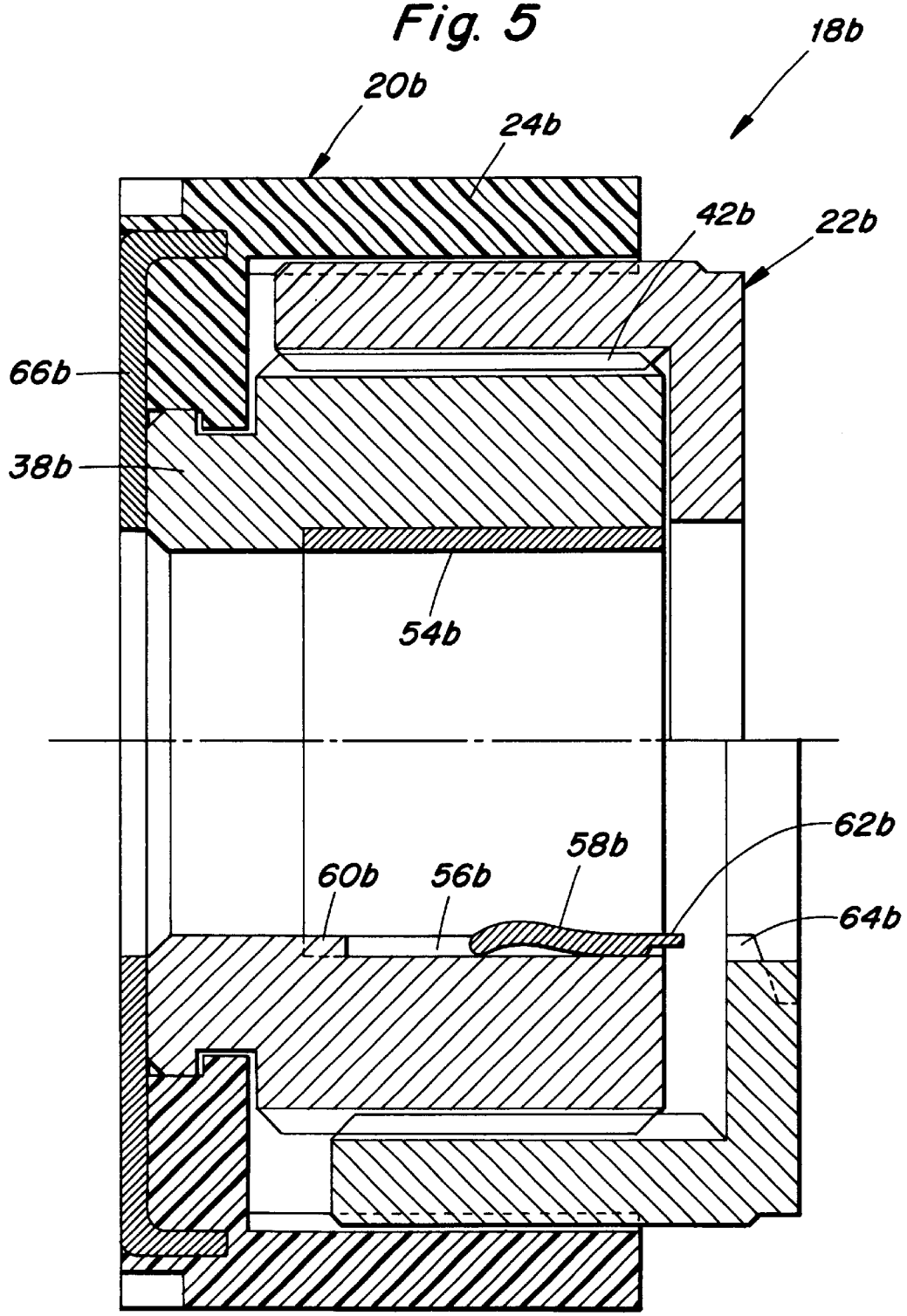

FIG. 5 shows an embodiment of a distance washer 18b in which the threading ring 38b is held axially tight but is able to turn in the supporting body 20b, and the threading is engaged only via a right threading 42b with the supporting body 22b. The end of the threading ring 38b, shown left in FIG. 5, supports itself, with low friction, on a metal plate 66b which is tightly connected to the housing 24b.

FIGS. 6 and 7 show an embodiment of a distance washer 18c in which the supporting body 20c made of metal is disposed in a housing 68c of plastic. At a minimal axial size (left in FIG. 7), both supporting bodies 20c, 22c and the threading ring 38c are taken up in the housing 68c and are protected from being touched. The supporting body 28c, here, has the form of an outer hexagon whose protruding edges are turned away on the largest part of the length, so that only six protruding teeth 70c remain standing at the inner end of the supporting body. The inner contour of the housing 68c is adjusted to fit the outer contour of the supporting body 22c, so that the supporting body is arranged non-rotatably secure in the housing. At the upper end, in FIG. 7, the housing 68c forms two lips 72c that protrude inward and grip over two of the teeth 70c. The teeth 70c and the lips 72c are arranged in such a way that the supporting body 22c allows itself to be clipped into the housing 68c from above and then is held securely in the housing.

Figure 8:
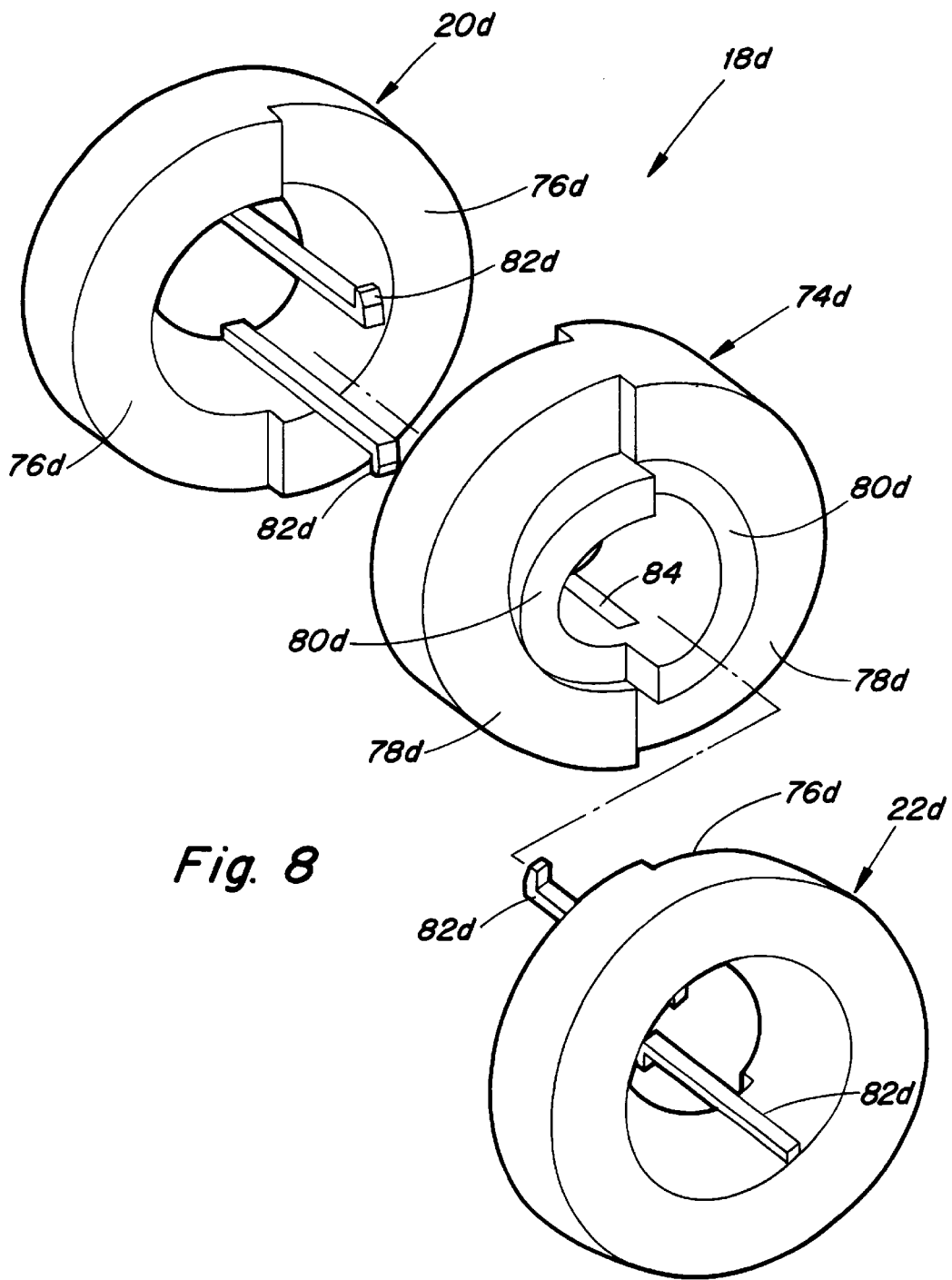
FIG. 8 shows a perspective exploded diagram of parts of the connecting device, according to a further embodiment.
Figure 9:
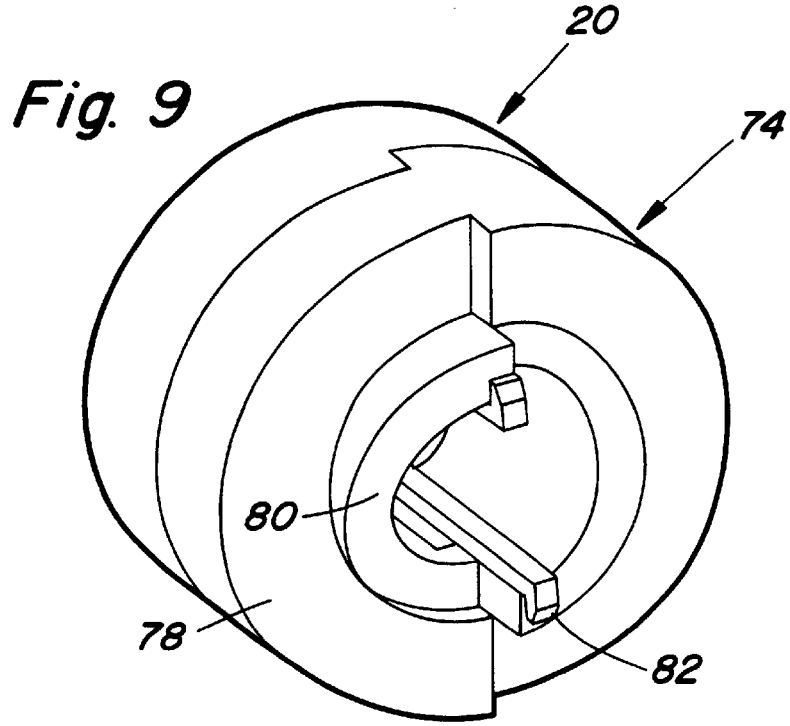
FIGS. 9 and 10 show parts of the device according to FIG. 8 in different positions, but with one of the supporting bodies removed for clarity.
Figure 10:
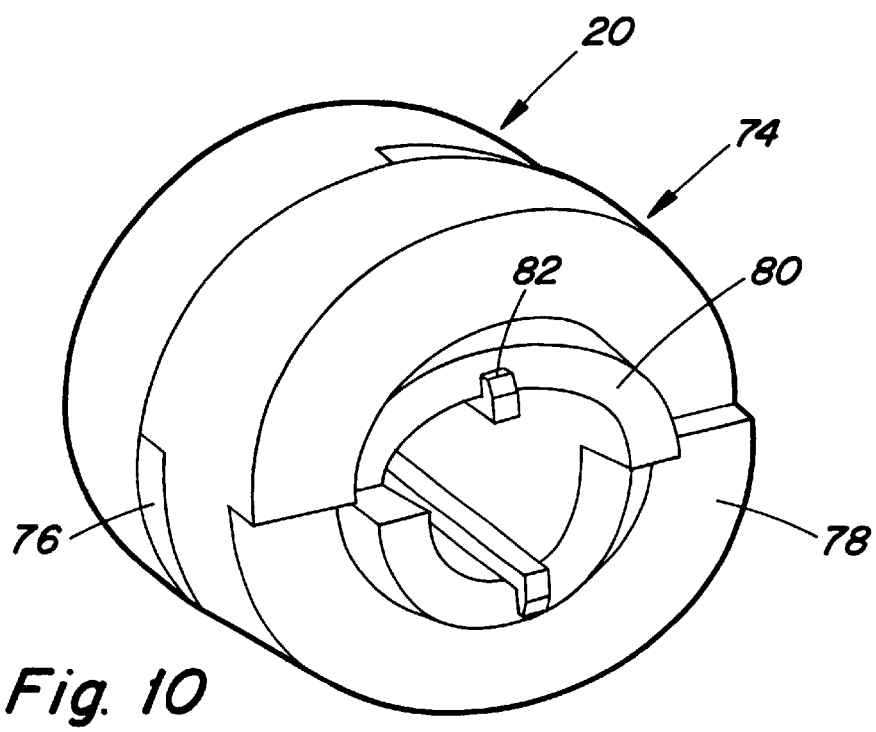

FIGS. 8 to 10 show an embodiment of a distance washer 18d in which the screw drives are formed not by inner and outer threading but by axially facing screw surfaces at the frontal sides of the supporting bodies and of the control element.

FIG. 8 shows, in an exploded diagram, the ring-shaped supporting body 20d and a ring-shaped control element 74d which, in terms of its function, corresponds to the threading ring 38d in the previous embodiments. The control element 74d is arranged symmetrically with respect to a symmetry plane arranged perpendicularly to the axis. The supporting body 22d is arranged with respect to that symmetry plane as a mirror-image of the supporting body 20d.

The supporting body 20d has two screw-shaped pitch surfaces 76d which each extend over an angle of 180° and work in concert with complementary screw surfaces 78d of the control element 74d. The control element 74d has, radially inwardly of the pitch surfaces 78d, two further pitch surfaces 80d which, in respect to the pitch surfaces 78d, have the opposite screwing direction and double the pitch. Each pair of surfaces 76d and 78d forms a screw drive which displaces the respective body 20d or 22d axially in response to rotation of the control element 74d.

At the inner periphery of the supporting element 20d, two holding grips 82d which, during the assembly of the control element and the supporting bodies, extend through the control element 74d and, with their hook-shaped, bent ends snap into the back of the pitch surfaces 80d. The supporting body 22d (not shown in FIGS. 9 and 10 for clarity) also includes two similar holding grips which are to lie directly next to the respective holding grips 82d of the element 20d, so that the angle distances between the paired neighboring holding grips measure almost 180°. Also, engagement between the holding grips of the bodies 20d, 22d prevents those bodies from rotating relative to one another. At the inner surface of control element 74d, a spring 84d is arranged which, within the space between the pairs of holding grips, frictionally engages the threading of the connecting screw 14 (not shown) without rubbing. The holding grips, thus, act at the same time as stopping devices which limit the control range of the control element 74d to somewhat less than 180°.

FIG. 9 shows the condition in which the supporting body 20d and the control element 74d are tightly connected to one another in the positions shown in FIG. 8, with the supporting body 22d removed for clarity. FIG. 10 shows the condition in which the control element has been turned by 45°. Through the effect of the pitch surfaces 76d and 78d lying against one another, thus, the axial size of the distance washer is increased. The height of the screw surfaces 80d, however, was reduced by the same amount, so that the holding grips 82d lie, as before, against the screw surfaces. If the control element 74d is then again turned in the counter-clockwise direction, then the pitch surfaces 80d and the holding grips 82d have the effect that the supporting body 20d and the not-shown supporting body 22d are again pulled together in the axial direction, so that the pitch surfaces 76d and 78d always continue to lie against one another.

A possible and, from a certain perspective, advantageous variation on the principle shown in FIGS. 8 to 10 involves the holding grips 82d being arranged, not on the supporting bodies 20d and 22d, but rather as protruding in opposite directions from the control element 74d. The corresponding pitch surfaces, corresponding to the pitch surfaces 80d in FIG. 8, would then lie retracted in the frontal surfaces of both of the supporting bodies 20d and 22d that are turned away from one another. This variation has the advantage that the torsional range of the control element 74d and the spring connected to it would not be limited by the holding grips 82d. Besides this, the holding grips and the spring can be manufactured in one piece as a structural part which is pressed into the ring-shaped control element 74d or injection molded to the same.

Generally, the form of construction with the pitch surfaces arranged at the frontal sides of the supporting bodies and of the control element has the advantage of making inexpensive manufacturing possible, since the costly cutting of the threading is eliminated.

In a further simplified embodiment, the pitch surfaces 80d and the holding grips 82d can also be entirely eliminated. In this case, however, the supporting bodies 20d, 22d can no longer be pulled together axially but can still be axially spread apart.

A torsional security of the supporting bodies 20d and 22d can be achieved in the same way as in the previously described embodiment examples, for example, by shaping one of the supporting bodies as an outer hexagon which is arranged in a housing connected with the other supporting body.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A device for interconnecting structural parts, comprising:
a distance holder adapted to be positioned between the structural parts and including first and second supporting bodies adjacently arranged along an axis, and a control element connected to both of the first and second bodies for rotation relative thereto to produce an axial extension of the first and second supporting bodies relative to each other in response to rotation of the control element about the axis;
the first and second supporting bodies being secured against relative rotation about the axis;
at least one of the first and second supporting bodies forming a screw drive with the control element; and
a connecting screw having a shank and a head, the shank extending axially through the distance holder and drivingly connected with the control element for rotating the control element about the axis, the connecting screw being connected with the control element by frictional force, wherein the connecting screw can slip relative to the control element when rotation of the control element is effectively resisted.

2. The device according to claim 1 wherein the at least one of the supporting bodies which forms a screw drive with the control element consists of both of the supporting bodies, so that both of the supporting bodies are axially displaced in response to rotation of the control element.

3. The device according to claim 2 wherein the two screw drives have different respective pitches.

4. The device according to claim 2 wherein the two screw drives have different screwing directions.

5. The device according to claim 2, wherein the control element comprises a threading ring having an inner threading forming a first screw drive with the first supporting body, and an outer threading forming a second screw drive with the second supporting body.

6. The device according to claim 2, wherein the control element comprises a threading ring which has an outer threading in a first axial section forming the screw drive with the first supporting body and, in another axial section, has an outer threading forming the screw drive with the second supporting body.

7. The device according to claim 1 wherein the control element includes at least one elastic reed engaging the connecting screw for transmitting rotation therefrom.

8. The device according to claim 1, wherein one of the supporting bodies forms a housing which, on an inner side thereof, is provided with axially running slots for guiding and torsionally securing the other supporting body.

9. The device according to claim 1, wherein one of the supporting bodies is disposed in a housing made of plastic which extends at least over a total axial length of the distance holder when the distance holder defines a minimum axial length.

10. The device according to claim 9 wherein one of the supporting bodies forms an outer hexagon and is guided in a correspondingly shaped inner contour of the housing.

11. The device according to claim 1 wherein both of the supporting bodies are tightly connected to one another.

12. The device according to claim 10 wherein the outer hexagon of the one supporting body is formed from protruding teeth at one end of the one supporting body and that, the inner contour of the housing includes at least one lip protruding inward to engage one of the teeth, both of the supporting bodies being tightly connected to one another.

13. The device according to claim 1, wherein the screw drive is formed by pitch surfaces arranged on axially facing sides of the supporting bodies and the control element.

14. The device according to claim 13, wherein at least one holding grip engages one of the pitch surfaces for converting rotational movement of the control element into axial movement of the supporting bodies.

15. The device according to claim 1 wherein the supporting bodies are arranged such that the axial spreading out of the supporting bodies occurs in response to rotation of the control element in one direction, and such that an axial returning of the supporting bodies occurs in response to rotation of the control element in an opposite direction.

16. A method of interconnecting first and second structural parts, comprising the steps of:

A) positioning a distance holder between the first and second structural parts, the distance holder comprising first and second supporting bodies adjacently arranged along an axis extending between the first and second structural parts, and a control element connected to both of the first and second supporting bodies for rotation relative thereto;

B) providing a screw passing axially through the first and second structural parts and the distance holder, the screw being threadingly connected to the first structural part and engaging the control element for rotating the control element; and C) rotating the screw about the axis while holding the first and second supporting bodies against rotation; thereby causing the rotation of the control element to produce an axial extention of the non-rotating first and second supporting bodies relative to one another until the first and second supporting bodies press against the first and second structural parts, respectively, wherein at least one of the supporting bodies forms a screw drive with the control element to produce axial movement of the at least one supporting body in response to rotation of the control element, the second structural part being clamped between the second supporting body and a head of the screw.

17. The method according to claim 16 wherein the screw engages the control element by frictional force, wherein step C includes permitting the screw to slip relative to the control element once the structural part is clamped between the second supporting body and the head of the screw.

18. A device for interconnecting structural parts, comprising:

a distance holder adapted to be positioned between the structural parts and including first and second supporting bodies adjacently arranged along an axis, and a control element connected to both of the first and second bodies for rotation relative thereto to produce an axial extension of the first and second supporting bodies relative to each other in response to rotation of the control element about the axis;

the first and second supporting bodies being secured against relative rotation about the axis;

the first and second supporting bodies forming respective screw drives with the control element, so that both of the supporting bodies are axially displaced in response to rotation of the control element, the two screw drives having different screwing directions; and a connecting screw extending axially through the distance holder and drivingly connected with the control element for rotating the control element about the axis.

* * * * *